United States Patent Office 3,591,579
Patented July 6, 1971

3,591,579
RESOLUTION OF AMINO-CAPROLACTAMS
Yasuo Shibahara, Sakyo-ku, Kyoto, Motoyuki Suzuki, Hirakata, Yoshihiro Hayashi, Ukyo-ku, Kyoto, and Toshiro Fukuda, Otsu, Japan, assignors to Sanyo Chemical Industries, Ltd.
No Drawing. Filed Aug. 13, 1968, Ser. No. 752,175
Claims priority, application Japan, Aug. 25, 1967, 42/55,051, 42/55,052
Int. Cl. C07d 41/06
U.S. Cl. 260—239.3                    8 Claims

ABSTRACT OF THE DISCLOSURE

A mixture of D- and L-α-amino-ε-caprolactams is resolved into its enantimorphs by converting the mixture, e.g. as the DL-aminolactam, into the salts with certain specific sulfonic acids, more especially with β-naphthalene-1-sulfonic acid or with 2-naphthyl amino-1-sulfonic acid, and then resolving the salts into the optically active isomers by crystallizing from a supersaturated solution thereof in a solvent (water or water-miscible organic solvent).

---

This invention relates to a process for producing optically active compounds and more particularly, to a process for optically resolving a mixture of D- and L-α-amino-ε-caprolactams.

The term "DL-" as used in the present invention means an unequimolecular mixture of two (D- and L-) optically active compounds as well as an equimolecular mixture of two optically active compounds.

The α-amino-ε-caprolactam (hereinafter referred to as "aminolactam") is important as an intermediate for producing lysine which is one of essential amino acids. Amino acids such as lysine are generally useful only in the form of the L-isomer, which is the form ordinarily occurring in nature. When such amino acids are synthesized by chemical processes, the products are almost invariably optically inactive. Therefore, it is necessary to resolve optically the products or intermediates thereof into D- and L-isomers.

Some chemical methods have heretofore been proposed for optically resolving DL-aminolactam. They are methods wherein DL - aminolactam is resolved by converting it into the diastereoisomers with pyrrolidone carboxylic acid or by converting it into the salt of hydrobromic acid. These known methods are not well suited for operations on an industrial scale, because they require rather expensive reagents or usually involve relatively complicated operations.

It is therefore an object of the present invention to provide an industrially practical process for resolving optically DL-aminolactam.

It is another object of the invention to provide a process for producing optically active lysines.

Other objects and advantages of the invention will become apparent from the following description.

We have found that DL-aminolactam can be successfully resolved into its substantially pure enantiomorphs by converting DL-aminolactam to its salt with certain specific sulfonic acids in any known manner and by means of simple operations.

In accordance with the present invention, DL-aminolactam is first converted to the salt thereof with a sulfonic acid selected from the class consisting of β-naphthalenesulfonic acid (hereinafter referred to as "β-acid") and 2-naphthylamine-1-sulfonic acid (hereinafter referred to as "tobias acid") and then the resulting salt is resolved into its optically active isomers by crystallizing from a supersaturated resolving solution of the salt in a solvent, preferably by seeding the solution with seed crystals of one of the isomers.

The DL-aminolactam sulfonate used in the present invention may be prepared by reacting DL-aminolactam with β-acid or tobias acid in known manners, for example, by merely mixing the two in a solvent, preferably under heating. If desired, the salt thus formed may be separated. The solvent to be used may be same as or different from the solvent to be used in the subsequent preparation of supersaturated solution employed for the resolution.

Preferable molar ratio of DL-aminolactam to the sulfonic acid is about 1:1, but a small excess of DL-aminolactam or the sulfonic acid may be used without any disadvantage, when β- acid is used, the salt is obtained in the form of its anhydrate or hydrate depending on the particular conditions employed. Thus, for example, the anhydrous salt may be prepared by the use of a solvent containing no water or a small amount of water, and vice versa. All these salts may be used in the present invention.

In the present invention, a solution of the salt is prepared by dissolving the salt prepared above in a solvent, or by dissolving DL-aminolactam and the sulfonic acid in a solvent to form the salt in situ. An equimolecular mixture of D-isomer and L-isomer is preferable, but an unequimolecular mixture may be used. A supersaturated resolving solution is prepared from the above solution in any known manner, such as by cooling the solution which is not supersaturated, or by evaporating the solvent from the solution which is not supersaturated. The degree of supersaturation may vary over a wide range, but 110–130% supersaturation (it means a supersaturated solution contains the salt in an amount of 10–30% excess to that in the saturated solution) may usually be most efficient for the resolution.

Any solvent in which the salt (hydrated or anhydrous) may be dissolved and from which the salt may be crystallized in the anhydrous or hydrated form may be used in the present invention. Examples of the solvent include water, alcohols having 1–5 carbon atoms (such as methanol, ethanol and isopropanol), alkyleneglycols having 2–4 carbon atoms (such as ethyleneglycol), alkylene ($C_{2-4}$) glycol monoalkyl ($C_{1-5}$) ethers (such as ethyleneglycolmonoethylether), lower fatty acids (such as acetic acid), di-(lower alkyl)-formamides (such as dimethylformamide and di-ethylformamide), di-(lower alkyl)-sulfoxides (such as dimethylsulfoxide), di-(lower alkyl)-acetamides (such as dimethylacetamide), ketones (such as acetone), acetonitrile, nitromethane, pyridine, dioxane and a mixture of two or more thereof. Among these solvents, preferable are water, lower alcohols and di-(lower alkyl)-formamides.

We have found that a mixture of water and at least one organic solvent described above which is miscible with water is particularly useful as the solvent for the optical resolution of DL-aminolactam sulfonate, because the use of mixed solvent has some advantages that the solubility of the DL-aminolactam sulfonates in such mixed solvent increases as shown in the Table 1 given hereinlater, and that the velocity of crystallization increases. The weight ratio of water to the organic solvent ranges preferably from 10:90 to 70:30 from the viewpoint of solubility of the salt and velocity of crystallization. Ratios outside of these ranges are generally unsatisfactory. Higher water content than the above results in the decrease of purity of the crystallized isomer, while higher content of the organic solvent results in the decrease of solubility and velocity of crystallization.

In the optical resolution of the present invention, where the supersaturated solution of the equimolecular mixture of the D- and L-aminolactam sulfonates is used, the solution is seeded with crystals of one of the optical isomers, so that same kind of optically active isomer as the seed is preferentially crystallized. The optically active aminolactam sulfonates (hydrated or anhydrous) may be used as the seed crystals. The amount of seed crystals may vary in a wide range, and the more the seed crystals are used, the more smoothly the resolution may be carried out. The amount of seed crystals may however be generally 1–10% by weight based on the D- and L-aminolactam sulfonates in the resolving solution.

Where the supersaturated solution of the unequimolecular mixture of the D- and L-sulfonates is used, the optically active isomer may be crystallized spontaneously and preferentially from the solution. It is, however, preferable to seed the solution with the same kind of crystals as the isomer which is rich in the solution. In this case the amount of seed crystals may also be less than 1% by weight based on the D- and L-aminolactam sulfonates in the resolving solution.

It is preferable to stir the resolving solution during the preferential crystallization although this is not always necessary. The crystallization temperature may vary over a wide range. The crystallization is preferably carried out at a temperature of 10–40° C.

The thus obtained crystals may be separated by filtration. The mother liquor contains the other optically active isomer in supersaturated state. The said isomer may be then crystallized from the mother liquor according to the above procedures. Thus the optical resolution may be carried out continuously by seeding a supersaturated resolving solution of the DL-sulfonate separately with the two enantiomorphs, crystallizing the respective enantiomorph, and adding the DL-aminolactam sulfonate to the mother liquor.

In one embodiment of the present invention, for example, the optically active isomers may be crystallized by passing alternately the supersaturated resolving solution through fixed beds of D- and L-seed crystals. Alternately, the resolution may also be conducted by feeding under agitation a supersaturated resolving solution to a separate resolving solution in which seed crystals have been suspended. More preferably, the optically active isomers may be crystallized by feeding the supersaturated solution to two separate resolving vessels containing a separate resolving solution respectively suspended with D- and L-seed crystals, the said vessels being connected in series or parallel through pipes, as described in U.S. Pat. No. 3,260,744. Alternately, a single resolving vessel may be divided into two compartments by a net, screen, perforated plate or the like, said compartments containing a resolving solution respectively suspended with D- and L-seed crystals, and the supersaturated solution is fed to the compartment(s), as described in U.S. Pat. No. 3,266,871.

The obtained optically active isomers may be purified by the recrystallization, if necessary. Any conventional process may be used in order to separate optically active aminolactams from the sulfonates obtained above. For example, they may be separated by passing the sulfonates through an ion-exchange resin, or by treating the sulfonates with an alkaline substance (such as sodium hydroxide, disodium carbonate and mono-sodium carbonate). In the case of the salts with tobias acid, the following process may be also used. Thus, the salts may be treated with a mineral acid (such as hydrochloric acid and sulfuric acid) to obtain tobias acid and the salts of optically active aminolactams with mineral acid. The mineral acid salts may be then treated in the same manner as in the above to obtain optically active aminolactams. Not only the optically active aminolactams but also the salts thereof may be hydrolyzed in any known manner (for example, in the presence of hydrochloric acid) to obtain D- or L-lysine salt.

Among the optically active lysine salts, L-lysine monohydrochloride is most useful. However, it has been difficult to separate directly L-lysine monohydrochloride from the above hydrolyzed solution. Therefore, it has been conventional that the monohydrochloride is prepared by reacting hydrochloric acid with L-lysine which is separated from the hydrolyzed solution, for example, by using an ion-exchange resin.

We have found that, in the case of the salt of L-aminolactam with β-acid, the monohydrochloride is more practically obtained by adding DL-aminolactam to the hydrolyzed solution which is prepared by hydrolyzing the salt in the presence of hydrochloric acid, precipitating L-lysine monohydrochloride or the salt of DL-aminolactam with β-acid which is less soluble in the hydrolyzed solution, and filtering the obtained precipitate. The hydrochloric acid in the hydrolysis may be used in a wide range of amount, e.g. equivalent or more to the salt of L-aminolactam. In case a large excess of hydrochloric acid is used, it is usually removed after the hydrolysis, for example, by drying up the hydrolyzed solution. The amount of DL-aminolactam may vary in a wide range (such as 50–150% by mole based on the mole of β-acid), preferably about 100% by mole. The obtained salt of DL-aminolactam with β-acid may be recycled to the resolution.

We have found that the normally unuseful D-aminolactam sulfonate obtained in the resolution of the present invention may be changed to the DL-aminolactam sulfonate by heating the same at a temperature higher than 150° C. preferably 200–250° C. and preferably in the atmosphere of inert gas (such as nitrogen or carbon dioxide). The obtained DL-aminolactam sulfonate may be recycled to the resolution.

The following Table 1 shows solubilities of DL-aminolactam β-acid salt in several organic solvents (alone and in a mixture with water).

TABLE 1

| Organic solvent | Solubility in original solvent alone | Solubility in a mixture with water (percent) | | | |
|---|---|---|---|---|---|
| | | 80 | 60 | 40 | 20 |
| Methanol | 4.8 | 9.8 | 11.6 | 10.0 | 6.2 |
| Ethanol | 0.7 | 5.6 | 11.6 | 11.4 | 7.0 |
| Acetone | 0.2 | 4.2 | 12.4 | 14.0 | 10.0 |
| Dioxane | 1.2 | 6.2 | 13.8 | 13.6 | 8.4 |
| Acetonitrile | 0.2 | 6.0 | 20.0 | 19.8 | 14.4 |
| DMF | 0.4 | 15.6 | 17.0 | 16.0 | 10.8 |

NOTES:
(1) Solubility in water alone is 4.8.
(2) Solubility is shown by gram number of the salt soluble in 100 g. of a solvent at 30° C.
(3) DMF is abbreviation for dimethylformamide.
(4) The 80% in the table, for example, shows a mixture of an organic solvent (80 g.) and water (20 g.).

The following examples illustrate the present invention, and it will be understood that the invention is not limited thereto.

EXAMPLE 1

An aqueous solution (800 ml.) containing L-aminolactam β-acid monohydrate salt (16 g.) and the D-isomer monohydrate salt thereof (28 g.) was seeded with D-aminolactam β-acid monohydrate salt crystals (1 g.) at 30° C., and stirred at the same temperature for 30 minutes. The obtained crystals were separated from the resulting solution by filtration, and dried. There was obtained D-isomer salt of 16 g. and its specific rotation ($[\alpha]_D^{25}$ (c.=2, $H_2O$), the same in Examples 2–9) was +13.7°. The purity was 96.5% as determined by the optical test.

The obtained D-isomer salt (15 g.) dissolved in water (300 ml.) was passed through a column charged with cation-exchange resin, which was then washed with enough amount of water, and eluted with 2-N-ammonia water. The resulting solution was concentrated. D-aminolactam (5.1 g.) was obtained by distillation of the concentrated solution at 124° C./4 mm. Hg.

EXAMPLE 2

An equimolecular mixture of D- and L-aminolactam (12.8 g.) and β-acid (20.8 g.) was dissolved in water (50 ml.) at 80° C., and the solution was cooled gradually to 20° C. to precipitate DL-aminolactam β-acid monohydrate salt, which was then filtered off. The monohydrate salt (21.4 g.) was dissolved in water (400 ml.) at 60° C., and the solution was cooled gradually to 30° C., seeded with the L-isomer monohydrate salt (0.9 g.) and then stirred at 30° C. for 30 minutes. The obtained crystals were separated from the resulting solution by filtration, and dried. There was obtained L-isomer salt (2.8 g.) with the specific rotation of −13.5° and purity of 95.0%.

L-aminolactam (0.7 g.) was obtained from the salt (2.5 g) by treating as in the Example 1.

EXAMPLE 3

The mother liquor of the Example 2 was allowed to stand at 25° C. for 2 hours. The obtained crystals were filtered off and dried. There was obtained D-aminolactam β-acid salt (2 g.) with the specific rotation of +12.5° and purity of 88.0%.

EXAMPLE 4

An equimolecular mixture (23 g.) of D- and L-aminolactam β-acid salts was dissolved in methanol (500 ml.) at 55° C., cooled gradually to 20° C., seeded with L-isomer salt (0.7 g.), and stirred at 20° C. for 90 minutes. By treating the precipitated crystals as in the Example 1 there was obtained L-aminolactam β-acid salt (2.5 g.) with the specific rotation of −13.0° and purity of 91.5%.

EXAMPLE 5

An equimolecular mixture of D- and L-aminolactam (12.8 g.) and tobias acid (22.3 g.) was dissolved in water (100 ml.) at 80° C., and the solution was cooled gradually to 20° C. to precipitate DL-aminolactam tobias acid salt, which was then filtered off. The salt (22 g.) was dissolved in methanol (400 ml.) at 50° C., and the solution was cooled gradually to 35° C., seeded with the L-isomer salt (2 g.) and then stirred at 35° C. for 30 minutes. The obtained crystals were filtered off, washed with methanol (10 ml.), and dried. There was obtained L-aminolactam tobias acid salt (4.4 g.) with the specific rotation of −12.7° and purity of 96.5%.

The obtained salt (4.4 g.) was treated with 2 N sulfuric acid methanol solution (63 ml.), and the solution was filtered off to separate tobias acid (2.8 g.). The filtrate was neutralized with sodium hydroxide. After the precipitate of sodium sulfate was separated by filtration, methanol was distilled off to obtain L-aminolactam (1.6 g.).

EXAMPLE 6

An equimolecular mixture (14 g.) of D- and L-aminotobias acid salts (2.4 g.) was dissolved at 50° C. in the mother liquor from which the L-isomer salt was separated by filtration in the Example 5, and the solution was cooled gradually to 35° C., seeded with D-isomer salt (1.0 g.) at 35° C., and agitated at 35° C. for 30 minutes. The obtained crystals were treated as in the Example 5 to obtain D-aminolactam tobias acid salt (4.6 g.) with the specific rotation of +12.9° and purity of 98.2%.

The salt was treated as in the Example 5 to obtain D-aminolactam (1.6 g.).

EXAMPLE 7

A methanol solution (300 ml.) containing D-aminolactam tobias acid salt (7.2 g.) and the L-isomer salt (7.8 g.) was seeded with the L-isomer salt (0.2 g.) at 35° C., and then treated as in the Example 5 to obtain the L-isomer salt (2.2 g.) with the specific rotation of −12.8° and purity of 97.3%.

EXAMPLE 8

An equimolecular mixture of (14 g. of D- and L-aminolactam tobias acid salt was dissolved in water (200 ml.) at 60° C. and the solution was cooled gradually to 33° C., and seeded with the D-isomer salt (1 g.). After seeding, the mixture was further cooled to 29° C. over 10 minutes, and maintained at the same temperature for 5 minutes under agitation. The obtained crystals were treated as in the Example 5 to obtain the D-isomer salt (2.6 g.) with the specific rotation of +11.9° and purity of 90.2%.

EXAMPLE 9

An equimolecular mixture (14 g.) of D- and L-aminolactam tobias acid salts was dissolved in dimethylformamide (100 ml.) at 60° C. and the solution was cooled gradually to 30° C., seeded with the L-isomer salt (2 g.), and agitated at 30° C. for 45 minutes. The obtained crystals were treated as in the Example 5 to obtain the L-isomer salt (6.6 g.) with the specific rotation of −12.1° and purity of 91.7%.

EXAMPLE 10

A solution containing equimolecular mixture of D- and L-aminolactam β-acid salts (87 g.) in a mixed solvent of methanol (400 g.) and water (400 g.) was charged in the 1 l. revolving vessel equipped with feed pipe, conduit having wire netting to prevent escape of seed crystals and stirrer, held at 30° C. and seeded with the L-isomer salt (5 g.) in sizes of 50–100 mesh. On the other hand, the equimolecular mixture of the salts was dissolved in the mixed solvent in the weight ratio of 135 (the salts):1,000 (the mixed solvent) at 55° C., and the solution was cooled gradually to 30° C. to obtain a supersaturated (125%) solution. The supersaturated solution was fed into the vessel with stirring at the rate of 30 ml. per minute over 3.5 hours (175 g. of the salt was added in all), and further stirred at 30° C. for 30 minutes. The obtained crystals were filtered off, and dried to obtain 67 g. of L-isomer salt (the degree of crystallization 71%) with the specific rotation of −13.8° ($[\alpha]_D^{20}$ (c.=2H$_2$O, the same in the Examples 11–19) and optical purity of 97.0% (the specific rotation of seed crystals being −14.2°).

EXAMPLE 11–15

In a manner similar to that of Example 10 except the conditions shown in the Table 2 were employed, a series of experiments were carried out. The conditions and results are shown in the Table 2.

TABLE 2

| Example | 11 | 12 | 13 | 14 | 15 |
|---|---|---|---|---|---|
| Water (percent) | 50 | 50 | 25 | | 100 |
| Methanol (percent) | | | | 100 | |
| Ethanol (percent) | | | 50 | | |
| Acetone (percent) | 50 | | | | |
| DMF (percent) | | | | 75 | |
| Feeding time (hrs.) | 3.5 | 3.5 | 3.0 | 3.5 | 3.0 |
| Degree of supersaturation of solution fed (percent) | 125 | 125 | 120 | 130 | 12.5 |
| Amount of DL-salt fed (g.) | 225 | 185 | 225 | 85 | 75 |
| Kind of seed crystals | (1) | (1) | (2) | (2) | (1) |
| Amount of seed crystals | 5 | 5 | 5 | 3 | 2 |
| Amount of crystals obtained (g.) | 78 | 72 | 85 | 23 | 33 |
| Specific rotation (°) | −11.2 | −11.4 | +13.5 | +12.0 | −9.5 |
| Kind of crystals obtained | (3) | (3) | (4) | (4) | (3) |

[1] L-isomer (monohydrate).
[2] D-isomer (anhydrous).
[3] Monohydrate.
[4] Anhydrate.

EXAMPLE 16

An equimolecular mixture (177 g.) of D- and L-aminolactam β-acid in a mixed solvent of methanol (990 g.) and water (510 g.) was charged into 2 l. resolving vessel which was divided into two equal compartments by wire netting (each of which was equipped with agitator), and held at 30° C. After the two compartments were seeded respectively with D- and L-crystals (anhydrous, 4 g. each), the equimolecular mixture of D- and L-isomer monohydrate salts was fed into both compartments with stirring at a rate of 10 g. every 10 minutes over 2.5 hours. After feeding, the solution was stirred for 30 minutes. Each kind of crystals (L-isomer salt in the one compartment and D-isomer salt in the other) was separately filtered off and dried. There were obtained L-isomer salt (anhydrous, 70 g.) with the specific rotation of −13.4° (purity 94.5%) and D-isomer salt (anhydrous, 69 g.) with the specific rotation of +13.6° (purity 96.0%).

EXAMPLE 17

The same equimolecular mixture (220 g.) as in the Example 16 in a mixed solvent of dimethylformamide (858 g.) and water (442 g.) was charged into the same vessel as in the Example 16, and held at 30° C. After the two compartments were seeded respectively with D- and L-crystals (anhydrous, 5 g. each), the mixture of D-isomer salt (monohydrate, 55%) and L-isomer salt (monohydrate, 45%) was fed into both compartments with stirring at a rate of 10 g. every 10 minutes over 3 hours.

Each kind of crystals was separately filtered off and dried. There were obtained L-isomer salt (anhydrous, 77 g.) with the specific rotation of −13.8° (purity 97.0%) and D-isomer salt (anhydrous, 90 g.) with the specific rotation of +13.6° (purity 96.0%).

EXAMPLE 18

The L-isomer salt (70 g.) obtained in the Example 17 was hydrolyzed in the presence of 3 N hydrochloric acid (77 g.) and then the DL-aminolactam (26.6 g.) was added to the hydrolyzed solution to precipitate DL-aminolactam β-acid monohydrate salt (70 g.) which was then filtered off. The obtained monohydrate salt was resolved as in the Example 2 to obtain L-isomer salt (9.1 g.) with the specific rotation of −13.6° and purity of 96.0%. On the other hand, the mother liquor containing L-lysine hydrochloride was concentrated to 70 g. by heating, added to methanol (90 g.) to precipitate the L-lysine hydrochloride dihydrate (42 g.).

EXAMPLE 19

The D-isomer salt (80 g.) obtained in the Example 17 was heated at 220–230° C. for 30 minutes in the atmosphere of nitrogen. The thus treated salt was dissolved in water (80 g.) at 80° C., and the solution was cooled gradually to 30° C. The precipitate was filtered off. There was obtained DL-aminolactam β-acid monohydrate salt (75 g.) with the specific rotation of +0.4° which was then resolved as in the Example 2 to obtain L-isomer salt (9.8 g.) with the specific rotation of −13.5° and purity of 95.0%.

What we claim is:

1. In a process for resolving optically a mixture of a salt of D-α-amino-ε-caprolactam with an acid and a salt of L-α-amino-ε-caprolactam with an acid into the optical active enantiomorphs thereof by crystallizing from a solution thereof in a solvent, the improvement which comprises using a sulfonic acid selected from the group consisting of β-naphthalenesulfonic acid and 2-naphthylamine-1-sulfonic acid as the acid for forming said salts.

2. A process according to claim 1, in which the solvent is at least one member selected from the class consisting of water and organic solvents which are miscible with water.

3. A process for resolving a salt of DL-α-amino-ε-caprolactam with a sulfonic acid selected from the class consisting of β-naphthalenesulfonic acid and 2-naphthylamine-1-sulfonic acid into the optically active enantiomorphs thereof which comprises (a) preparing a solution of said salt in at least one solvent, (b) contacting said solution with seed crystals of one optically active enantiomorph of said salt, (c) permitting said one enantiomorph to crystallize preferentially from said solution and (d) separating the crystals of the optically active enantiomorph of said salt from the remainder of said solution.

4. A process according to claim 3, in which said solvent of the solution is a mixture of water and at least one organic solvent which is miscible with water and the weight ratio of water to the organic solvent is from 10:90 to 70:30.

5. A process according to claim 4, in which the organic solvent is at least one member selected from the class consisting of lower alkanols and di-(lower alkyl)-formamides.

6. A process according to claim 3, in which said solution is supersaturated with respect to said salt.

7. A process according to claim 3, in which said salt of DL-α-amino-ε-caprolactam with the sulfonic acid is the salt obtained by hydrolyzing a salt of L-α-amino-ε-caprolactam with β-naphthalenesulfonic acid in the presence of hydrochloric acid, adding DL-α-amino-ε-caprolactam to the obtained hydrolyzed solution, and separating the obtained salt of DL-α-amino-ε-caprolactam with β-naphthalenesulfonic acid from L-lysine monohydrochloride.

8. A process according to claim 3, in which said salt of DL-α-amino-ε-caprolactam with the sulfonic acid is the salt obtained by heating a salt of D-α-amino-ε-caprolactam with β-naphthalenesulfonic acid at the temperature higher than 150° C.

References Cited

UNITED STATES PATENTS

| | | | |
|---|---|---|---|
| 2,617,823 | 11/1953 | Wolff et al. | 260—519 |
| 2,983,757 | 5/1961 | Zaugg | 260—707 |
| 3,065,261 | 11/1962 | Stephens | 260—490 |
| 3,174,986 | 3/1965 | Motozaki et al. | 260—707 |
| 3,266,871 | 8/1966 | Mizoguchi et al. | 260—207 |
| 3,275,619 | 9/1966 | Brenner et al. | 260—239.3 |

OTHER REFERENCES

Gilman "Organic Chemistry," vol. 1, chapter 3, part IV, pp. 181–197 (1938).

HENRY R. JILES, Primary Examiner

R. T. BOND, Assistant Examiner

U.S. Cl. X.R.

260—707, Resolution, Digest